United States Patent
Wouters

(10) Patent No.: US 6,372,847 B1
(45) Date of Patent: Apr. 16, 2002

(54) POLYOLEFIN COMPOSITIONS HAVING IMPROVED LOW TEMPERATURE TOUGHNESS

(75) Inventor: Guy J. Wouters, Brussels (BE)

(73) Assignee: Exxon Mobil Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/567,937

(22) Filed: May 10, 2000

(51) Int. Cl.[7] .............................. C08F 8/00; C08L 9/00; C08L 23/00; C08L 25/02; C08L 45/00
(52) U.S. Cl. ........................ 525/191; 525/210; 525/232; 525/240; 525/241
(58) Field of Search ................................ 525/191, 210, 525/232, 240, 241

(56) References Cited

U.S. PATENT DOCUMENTS

| | | |
|---|---|---|
| 4,670,515 A | 6/1987 | Olivier |
| 5,576,374 A | 11/1996 | Betso et al. |
| 5,674,613 A | 10/1997 | Dharmarajan et al. |
| 5,688,866 A | 11/1997 | Silvis et al. |
| 5,763,534 A * | 6/1998 | Srinivasan et al. ......... 525/240 |
| 5,807,946 A | 9/1998 | Jourdain et al. |
| 5,811,494 A | 9/1998 | Whetten et al. |

FOREIGN PATENT DOCUMENTS

| | | |
|---|---|---|
| EP | 855413 A1 | 7/1998 |
| WO | WO 94/06859 | 3/1994 |
| WO | WO 94/07930 | 4/1994 |
| WO | WO 97/07146 | 2/1997 |
| WO | WO 98/27154 | 6/1998 |
| WO | WO 98/34965 | 6/1998 |
| WO | WO 98/18865 | 7/1998 |
| WO | WO 99/65982 | 12/1999 |

OTHER PUBLICATIONS

Stephen D. Brignac, et al., "The Effects of EPM Long Chain Branching on TPO Properties"—J. Vinyl Addit. Technol., (1996), pp. 235–239.
Stephen D. Brignac, et al., "The Effects of EPM Long Chain Branching on TPO Properties"—Annu. Tech. Conf.—soc. Plast. Eng., (1966), vol. 54, pp. 3353–3357.
Ying Yang et al., Polymer, vol. 39(15), pp. 3365–3372 (1998), "Physical characterization of a polyolefinic thermoplastic elastomer."
Robert C. Cieslinski et al., Polymer, vol. 36(9) –pp. 1827–1833 (1995), "Real–time cryo–deformation of polypropylene and impact–modified polypropylene in the transmission electron microscope."

* cited by examiner

Primary Examiner—Nathan M. Nutter
(74) Attorney, Agent, or Firm—Frank E. Reid

(57) ABSTRACT

Disclosed are blends of a propylene-based polymer, an elastomer, and optionally an ethylene-based polymer, having improved low temperature toughness. The elastomer is preferably a copolymer of ethylene, one or more $C_3$–$C_{20}$ α-olefin comonomers, and optionally one or more non-conjugated diene comonomers, having a MLRA/ML ratio of at least 8 and an ethylene content of from 74 to 95 mole percent.

16 Claims, 2 Drawing Sheets

Effect of EP Ethylene Content on TPO Blend Ductile to Brittle Transition Temperature

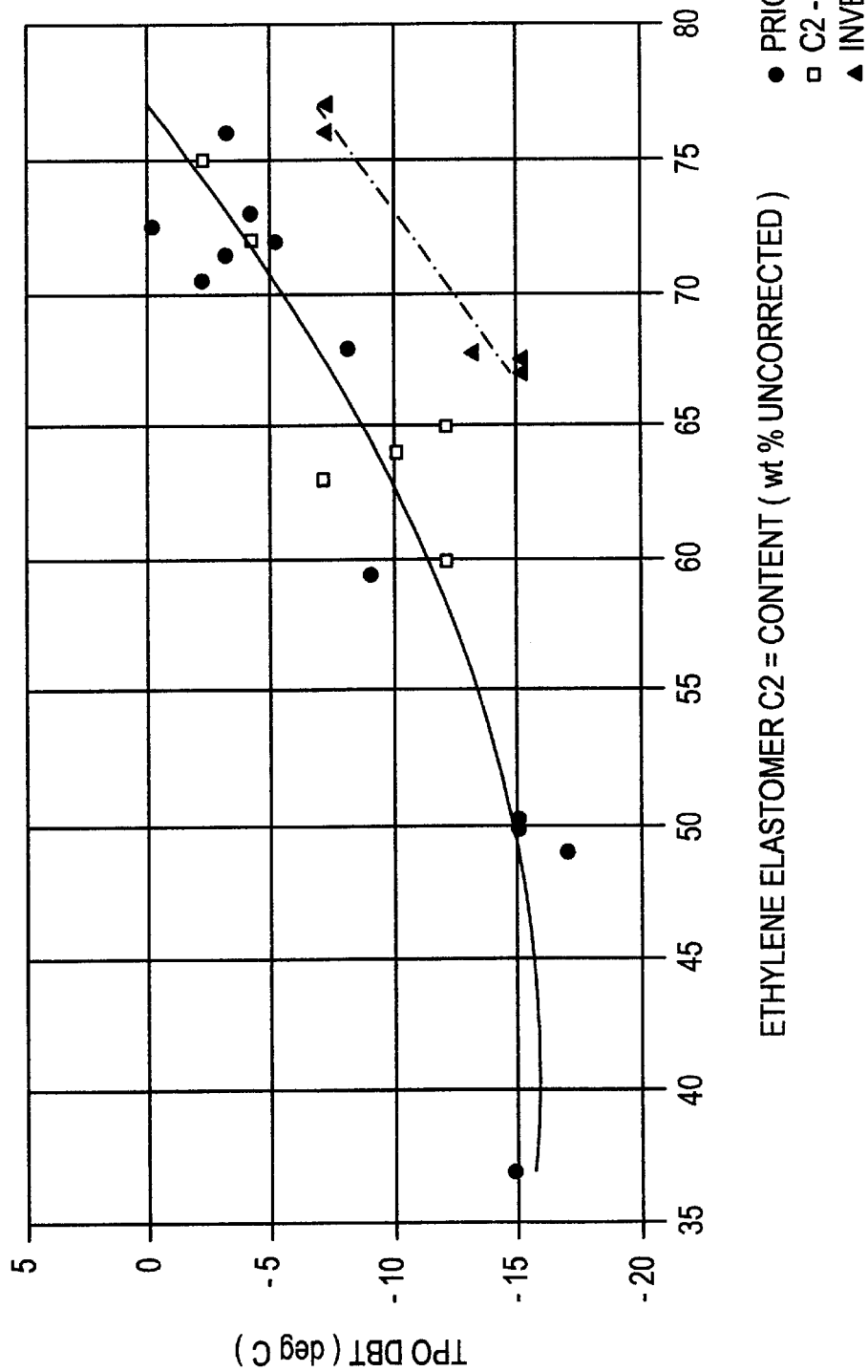

POLYOLEFIN COMPOSITIONS HAVING IMPROVED LOW TEMPERATURE TOUGHNESS

SUMMARY

This invention is related to blends of propylene-based polymers and branched ethylene-based elastomers.

BACKGROUND

Thermoplastic olefin elastomers blends (TPO's) are defined as blends of polypropylene with olefinic copolymer elastomers and optionally fillers and other compounding ingredients. TPO's are multiphase polymer systems where the polypropylene forms a continuous matrix and the elastomer and filler are the dispersed phase. The polypropylene matrix imparts to the TPO tensile strength, rigidity and chemical resistance, while the elastomer, sometimes referred to as the "modifiers", provides flexibility, resilience, toughness, especially at low temperature, and, in some cases, paintability.

TPO's are particularly well suited for producing flexible structures such as body parts for automotive applications. The principal automotive applications include bumper fascia, air dams and other trim, dashboards, and airbag covers. Various TPO formulations are available having physical properties highly desirable in such applications. The ability of TPO's to be injection molded makes them particularly attractive for the high volume production necessary in automotive applications.

Traditionally, ethylene-propylene copolymers (EP) and ethylene-propylene-diene terpolymers (EPDM) have been used as the elastomeric component in TPO blends. The low temperature impact strength of polypropylene modified with EP/EPDM increases as the ethylene content of the elastomer decreases down to about 50 percent by weight and/or, at constant morphology, as molecular weight (as measured by Mooney viscosity) of the elastomer increases.

The blending process involves the melt mixing of the polymers and blend pelletization. Such compounding is typically effected by Banbury mixing of elastomer bales with polypropylene pellets followed by extruder pelletization of the blend. In recent years, the preferred method of compounding has been by extrusion blending of the olefinic elastomer with the polypropylene and on-line blend pelletization of the final blend. This latter process is more economical but requires the use of olefinic elastomers in a stable pellet form to feed the mixing extruder. This requirement has limited the choice of olefinic elastomer modifiers to those that can be produced and stored in pellet form without agglomerating.

Two solutions have been developed and used to address this requirement. The first involves the use of pelletized elastomer masterbatches prepared by blending amorphous olefinic elastomers with a crystalline polyolefin (generally ethylene or propylene polymers). A disadvantage of this solution is that it significantly increases production costs of the modifier.

The second solution involves the use of olefinic elastomer modifiers having an ethylene content sufficiently high to develop a level of crystallinity that allows their production in a non-agglomerating pellet form. Ethylene elastomers suitable for the production of storage-stable pellets have a measurable crystallinity at or above storage temperature. In EPDM, the crystallinity is function of the ethylene content of the polymer, the monomer sequence distribution, and the compositional distribution. For additional information, see G. Ver Strate, "Ethylene-Propylene Elastomers," *Encyclopedia of Polymer and Engineering Science,* vol. 6, (1986).

For example, in Ziegler-Natta, single-site catalyzed ethylene-propylene elastomers, the required minimum ethylene level to exhibit sufficient crystallinity for pellet stability is about 74 mole %. However, the use of a surface stabilizer dusting agent like HDPE powder or talc may still prove necessary to completely prevent pellet agglomeration. This minimum ethylene content can vary somewhat depending on the type of catalyst used for the synthesis of the polymer, which can in turn affect the monomer sequence distribution and compositional distribution (see Ver Strate, cited earlier).

The crystallinity of ethylene based elastomers is conveniently measured by Differential Scanning Calorimetry (DSC), and is strongly related to the thermal history of the polymer. Semi-crystalline EP/EPDM elastomers have single or multiple crystalline melting points above 23° C. The temperature of these melting peaks depends on the ethylene content of the polymer, on the ethylene sequence and compositional distribution, and on the thermal history of the polymer. They typically range from about 30° C. up to about 90° C. in polymers of very high ethylene content. When a polymer sample is melted (typically at 150° C. or above) and allowed to cool down, these crystalline melting peaks develop slowly with time. Therefore, their relative quantification requires rigorous sample preparation protocols. We prefer therefore characterizing the crystallinity of EP elastomers by their total crystallization enthalpy measured by DSC after sample annealing at 150° C. or above. Also, we prefer using a modulated DSC technique which permits clear identification of the onset and the end of the crystallization exotherms and the fusion endotherms. Accordingly, ethylene based elastomers suitable for the production of non-agglomerating pellets generally have a crystallization enthalpy of at least 12 joules per gram (J/g).

Recently, other ethylene-alpha olefin elastomers have been used as such modifiers, especially ethylene-butene and ethylene-octene copolymers. These materials, especially the ethylene-octene copolymers, develop crystallinity at a lower ethylene weight content than EP/EPDM's. This permits the production pellet-stable ethylene-octene modifiers exhibiting good performance as polypropylene impact modifier. However, these materials also increase the overall production costs of the modifier, and thus the TPO, due to the higher raw material cost of octene versus propylene.

Dharmarajan and Kaufman, "High flow TPO compounds containing branched EP(D)M modifiers," *Rubber Chem. Tech.,* 71(4) (1998) pp. 778–794, discloses compounding polypropylene with branched EPDM's. EP(D)M as used herein is intended to mean that the diene monomer is optional, as indicated by the parentheses, and although EP technically represents ethylene-propylene elastomer, "EP," as used herein, is intended to include elastomeric copolymers of ethylene and any alpha-olefin capable of forming such a polymer. The introduction of long chain branching in the EPDM structure was shown to result in improved TPO impact strength over linear EP/EPDM. However, the TPO's described still showed a strong dependence of their low temperature impact strength on the ethylene content of the modifier, and the modifiers described still had too low an ethylene content to be produced in non-agglomerating pellet form.

The use of branched EPDM in combination with a compatibilizer is also described in WO 98/27154. Again, the EPDM described has too low an ethylene content to be produced in storage stable pellets.

A paper published in *Journal of Additive Technology*, vol. 2 (1998), pp. 235–239, describes the effect of EPM long chain branching on TPO properties and indicates that branching results in lower impact strength. The blends described comprise a branched EPM of too low ethylene content to be produced in stable pellet form. The authors report that the poor results could be explained on the basis of a poor morphology, and did not highlight the benefits brought by long chain branching to the low temperature impact strength of TPO's.

U.S. Pat. No. 5,688,866 describes TPO blends based on polypropylene and about 30 weight percent of substantially linear ethylene interpolymers. The authors use a melt index ratio $I_{10}/I_2$ to quantify the shear thinning which is said to result from the presence of branching in the described polymers, and claim a $I_{10}/I_2$ ratio measured at 190° C. of greater than or equal to 5.83. This melt flow rate ratio is however not well adapted to EP(D)M's since most EP(D) M's show very low flow under the $I_2$ conditions (typical MFI under 2.16 Kg @ 190° C. are below 0.1 g/10 min.). As will be shown below, the branched polymers used in our invention are however characterized by a branching level significantly higher than the substantially linear ethylene interpolymers (ethylene-octene copolymers) of U.S. Pat. No. 5,688,866.

It would be desirable to develop new TPO modifiers having an improved balance of properties. In particular, it would be desirable for a new class of TPO modifiers to have both an improved resistance to agglomeration when stored in pellet form and offering similar or better improvement in impact strength when blended with a polypropylene. It would be even more advantageous if such a modifier could be produced from lower cost raw materials than currently used modifiers.

SUMMARY OF THE INVENTION

It has now been discovered that a copolymer of ethylene and an alpha-olefin having a high ethylene content and a sufficient level of long-chain branching can be produced in non-agglomerating pellet form and also provide impact modification in a TPO blend similar to or better than linear or substantially linear ethylene-alpha-olefin copolymers, and better than linear or less branched EP's and EPDM's. The TPO's of this invention using a branched EP or EPDM as a modifier can also achieve the desired balance of properties more economically than either those using linear or substantially linear copolymers of ethylene and octene as a modifier or those using a non-pelletized modifier.

The TPO's of this invention are formed by blending a propylene-based polymer with a branched copolymer of ethylene, an alpha-olefin, and optionally a diene monomer (EP/EPDM) as a modifier. Preferred branched EP/EPDM modifiers according to this invention have both a high ethylene content and a high level of long-chain branching. The ethylene content is sufficient to enable production of the modifier in non-agglomerating pellets, and is preferably from about 74 to about 95 mole %. The long-chain branching is sufficient to provide the desired level of impact strength modification when blended with a propylene-based polymer. A preferred modifier is a copolymer of ethylene, one or more $C_3$ to $C_{20}$ α-olefins, and optionally up to 3 mole % of a non-conjugated diene. In a preferred embodiment, the modifiers according to this invention have a MLRA/ML ratio of 8 or more, where MLRA is the Mooney Relaxation Area (area under the Mooney Relaxation Curve) and ML is the Mooney viscosity.

The crystalline or semi-crystalline propylene-based polymer can be a polypropylene homopolymer or optionally contain one or more comonomers selected from ethylene and $C_4$ to $C_{20}$ α-olefins. Preferred propylene polymers have a propylene content (meaning units derived from propylene) of 60 mole percent or more, more preferably 65 mole percent or more, even more preferably 70 mole percent or more.

The composition according to this invention can optionally further contain a third polymer such as a crystalline ethylene/α-olefin copolymer, to improve for example, the impact/stiffness balance of the TPO blend or its resistance to blushing. In yet another embodiment, the composition can contain a fourth blend component such as another ethylene-based elastomer.

BRIEF DESCRIPTION OF THE DRAWINGS

FIG. 2 shows a comparison of TPO's prepared with a modifier according to this invention relative to TPO's prepared with modifiers found in the prior art.

DESCRIPTION OF THE INVENTION

Figure 1:
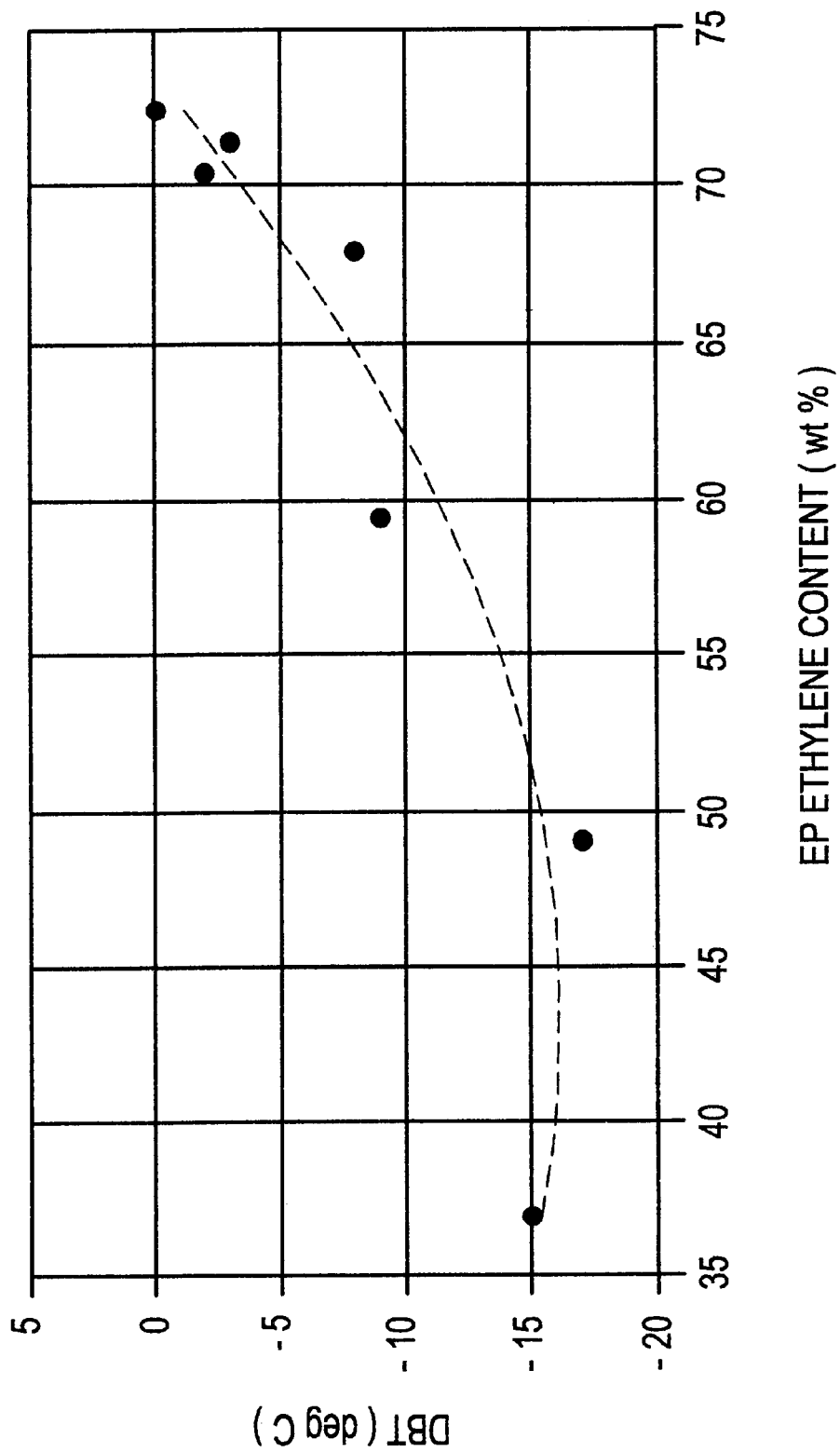
FIG. 1 shows the ductile-to-brittle transition temperature (DBT) as a function of modifier ethylene content for blends of isotactic polypropylene and an essentially linear ethylene-propylene copolymer modifier.

The invention concerns the production of TPO's formed by physically blending a highly branched, high ethylene content ethylene/α-olefin copolymer with any propylene-based polymer having a crystallinity from isotactic or syndiotactic polypropylene segments, preferably isotactic segments. Such propylene-based polymers include, but are not limited to, isotactic polypropylene homopolymer, syndiotactic polypropylene homopolymer, sequentially made reactor copolymers, often called reactor copolymers, or impact copolymers (ICP's) or reactor TPO's (RTPO's), and which can contain from about 1 to about 25 wt. % ethylene or an alpha olefin comonomer of 4 to 16 carbon atoms, random copolymers, and other thermoplastics where a ductile-to-brittle-transition temperature is an important performance characteristic. As used herein, reactor copolymers refers to sequentially made reactor copolymers. The improved TPO's of this invention are particularly useful for production of molded articles where impact toughness at low temperatures is an important quality.

Following is a detailed description of certain preferred compositions within the scope of our invention, preferred methods for producing these compositions, and preferred applications of these compositions. Those skilled in the art will appreciate that numerous modifications to these preferred embodiments can be made without departing from the scope of the invention.

Propylene-based Polymer

The polypropylene may be homopolypropylene, propylene-based copolymers, or combinations of the two. The term "polypropylene", as used in this description and the appended claims, is defined to mean a crystalline or semi-crystalline propylene-based polymer having a propylene content of at least 60 mole percent, preferably 65 mole percent or more, more preferably 70 mole percent or more. The polypropylene polymer has crystallinity from either isotactic or syndiotactic polypropylene segments.

In a preferred embodiment, the polypropylene polymer (homopolymers and/or copolymers) is an isotactic polypropylene with a melt flow rate (measured according to ASTM D-1238 under 2.16 kg @ 230° C.) ranging from 0.1 to 100 g/10 min., more preferably from 5 to 80 g/10 min., even more preferably from 10 to 70 g/10 min.

When the polypropylene component either consists of or contains one or more copolymers, such copolymers are preferably composed of propylene as a main monomer with lesser amounts of one or more of ethylene and alpha olefins other than propylene. If a copolymer is used, it is preferably a reactor copolymer with ethylene having at least 60 mole percent propylene more preferably 65 mole percent or more, even more preferably 70 mole percent or more. A good description of semi-crystalline polypropylene polymers and reactor copolymers can be found in "Polypropylene handbook," E. P. Moore Editor, Carl Hanser Verlag, 1996.

Exemplary alpha-olefins may be selected from the group consisting of ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

Preferably, the propylene-based polymer component of the present invention is predominantly crystalline, i.e., it has a melting point generally greater than about 110° C., preferably greater than about 115° C., and most preferably greater than about 130° C., as measured according to ASTM D-3417. The propylene polymer component may be a combination of homopolypropylene, and/or reactor, random, and/or block copolymers. When the above propylene polymer component is a random copolymer, the percentage of the copolymerized alpha-olefin in the copolymer is, in general, up to about 9%, preferably 8% or less, more preferably 6% or less by weight. Such random copolymers typically contain at least 1% and usually 2% or more by weight of the selected comonomer(s). The preferred alpha-olefins contain 2 or from 4 to about 12 carbon atoms. The most preferred alpha-olefin is ethylene. One, or two or more alpha-olefins can be copolymerized with propylene.

Branched Elastomer

In one preferred embodiment, the branched elastomer is a copolymer of ethylene, one or more α-olefin comonomers, and optionally one or more non-conjugated diene monomers. The minimum ethylene content of the elastomer is preferably 74 mole percent or more, more preferably 75 mole percent or more, even more preferably 76 mole percent or more. The maximum ethylene content of the elastomer is preferably 95 mole percent or less, more preferably 90 mole percent or less, even more preferably 88 mole percent or less. The amount of diene is preferably no greater than about 3 mole %, more preferably no greater than about 1.5 mole %. The diene is a non-conjugated diene, preferably ethylidene norbornene, vinyl norbornene, norbornadiene, dicyclopentadiene, 1,4-hexadiene (available from DuPont Chemicals), 1,1,2-trimethyl-1,4-pentadiene, and α,ω dienes.

The preferred α-olefin comonomers include linear, branched, or ring-containing $C_3$ to $C_{30}$ α-olefins or combinations thereof. Preferred linear α-olefins include $C_3$ to $C_8$ α-olefins, more preferably propylene, 1-butene, 1-hexene, and 1-octene. Preferred branched α-olefins include 4-methyl-1-pentene, 3-methyl-1-pentene, and 3,5,5-trimethyl-1-hexene. Preferred ring-containing α-olefins include as a ring structure at least one aromatic-group. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. Preferred aromatic-group-containing monomers contain at least one aromatic structure appended to a polymerizable olefinic moiety. The polymerizable olefinic moiety can be linear, branched, cyclic-containing, or a mixture of these structures. When the polymerizable olefinic moiety contains a cyclic structure, the cyclic structure and the aromatic structure can share 0, 1, or 2 carbons. The polymerizable olefinic moiety and/or the aromatic group can also have from one to all of the hydrogen atoms substituted with linear or branched alkyl groups containing from 1 to 4 carbon atoms. Particularly preferred aromatic monomers include styrene, alpha-methylstyrene, vinyltoluenes, vinylnaphthalene, allyl benzene, and indene, especially styrene and allyl benzene.

Branched ethylene-alpha olefin polymers can be obtained via various polymerization processes like solution, slurry or gas phase polymerization processes. Long chain branching can be introduced via different known methods in ethylene alpha-olefin elastomers i.e. by: 1) use of acidic catalysts for the polymerization of diene containing ethylene based elastomers (i.e. in Ziegler-Natta polymerization, acidic catalysts are believed to cause macromolecules coupling through cationic reaction at a diene unsaturation); 2) use of a diene having two double bonds reactive in the polymerization process, such as but not limited to vinylnorbornene, as described in U.S. Pat. No. 5,674,613, or norbornadiene, dicyclopentadiene, or alpha-omega dienes, as described in EP 0 855 413, or 3) copolymerization with chain end unsaturated macromers, for example, as described in WO 98/34965 and WO 94/07930. Various routes towards EPDM branching are described in G. Ver Strate, "Ethylene-Propylene Elastomers," *Encyclopedia of Polymer and Engineering Science*, vol. 6, (1986). Any catalyst, including metallocene catalyst systems, known to incorporate the monomers or macromers as described above to produce long chain branching, and/or known to cause long chain branching by macromolecules coupling as described above may be used for production of the elastomer component according to this invention. All documents mentioned in this paragraph are fully incorporated by reference for purposes of U.S. patent practice.

Preferred branched elastomers according to this invention have sufficient ethylene crystallinity to exhibit a pellet stability, or resistance to agglomeration, at a temperature at least equal to and more preferably higher than the storage temperature. In one preferred embodiment, the maximum storage temperature without agglomeration is 25° C. or more, more preferably 30° C. or more, even more preferably 35° C. or more, most preferably 40° C. or more. Storage stability can be further improved by coating the pellets with low levels (typically <1.5 wt %) of a dusting agent like polyethylene powder (HDPE or LDPE), or polypropylene powder, or talc or calcium stearate, or other suitable pellet surface coating agents.

The amount of long chain branching for the branched elastomers according to this invention is measured as the ratio of MLRA/ML wherein MLRA is the area under the Mooney Relaxation Curve and ML is the Mooney viscosity, both measured according to ASTM D 1646 (1+4 @ 125° C.) using a MV 2000 E (manufactured by Alpha Systems) or equivalent equipment capable of measuring Mooney relaxation. The MLRA is calculated by measuring the Mooney stress relaxation starting 1 second after the rotor is stopped and continuing to collect measurements up to 100 seconds of stress relaxation time. ML is expressed in "Mooney units" which is a measurement of torque. MLRA is expressed in "Mooney units (torque)×sec." Calculation of these values is explained in ASTM D 1646-99, which is fully incorporated herein by reference for purposes of U.S. patent practice.

Mooney Relaxation is a stress relaxation test. Relaxation time is strongly dependent on the presence of very high molecular weight species in a polymer. Short macromolecular chains relax quickly leading to low MLRA while high molecular weight macromolecules relax more slowly increasing thus the MLRA. Since long chain branching results in significant molecular weight build-up, it increases the MLRA. Accordingly, we have found that the ratio of MLRA/ML constitutes a good measurement of the degree of long chain branching in ethylene-based elastomers.

Polymers having a MLRA/ML ratio below 3 can be considered as having a structure essentially linear and a narrow molecular weight distribution. Higher MLRA/ML corresponds to structures having an increasing level of long chain branching. The branched elastomers according to this invention have a ratio of MLRA/ML of 8 or more, more preferably 9 or more, even more preferably 10 or more. Typically, the MLRA/ML of the branched polymer will not exceed 20, more preferably 15.

Typical branched elastomers of this invention have Mooney viscosities measured at (1+4 @ 125 C.) comprised between 1 and 90, more preferably between 2 and 70, even more preferably between 5 and 60. The choice of the Mooney viscosity of the modifier will be dictated by the molecular weight of the base polypropylene to modify, measured by its MFR. Low MFR polypropylenes (higher molecular weight) will require modifiers of higher Mooney viscosity, whilst high MFR polypropylenes (lower molecular weight) will require modifiers of lower Mooney viscosity. Preferred branched elastomers have a crystallization enthalpy of at least 12 J/g, more preferably 15 J/g, even more preferably 18 J/g. Typically, the crystallization enthalpy of the branched elastomer will be less than 100 J/g, more preferably less than or equal to 80 J/g, even more preferably less than or equal to 60 J/g. The branched elastomers of this invention can advantageously be pelletized by methods well known to those skilled in the art. If required, pellets can be coated with suitable dusting agents like for example polyethylene powder (HDPE or LDPE), or polypropylene powder, or talc or calcium stearate, or other suitable pellet surface coating agents to further improve pellet resistance towards agglomeration. Preferably, such pellets can be stored without agglomeration or at least without substantial agglomeration at room temperature (25° C.) or lower temperatures, more preferably at up to 35° C., even more preferably at up to 40° C. Storage and handling of such pellets becomes easier as the agglomeration temperature of the branched elastomer increases. Pellets that have not agglomerated can be fed directly to an extruder by standard methods for compounding into a TPO.

TPO Compound

It has now been discovered that blending the branched elastomers and propylene-based polymers, as described above, results in TPO having substantially equal to or better low temperature toughness than those currently available (e.g. polypropylene blends with substantially linear ethylene-octene copolymers or with linear or less branched EP/EPDM).

In a preferred embodiment, all blend components of the TPO are fed to one or more extruders for melt blending of the components. However, blending of the components can be performed by any conventional method well know to those skilled in the art. In most applications it will be desirable that the polypropylene phase be continuous or nearly continuous. The elastomer phase exists in discrete domains dispersed throughout the polypropylene phase. Most commonly, the elastomer will be an ethylene-propylene, ethylene-butene or ethylene-octene copolymer or an ethylene-propylene terpolymer, however, other rubber compositions may be used. The term "elastomer", as used in this description and the appended claims shall mean any essentially non-crystalline or semi-crystalline polymeric component having a low glass transition temperature (typically $\leq -35°$ C.).

Preferred TPO's according to this invention have a ductile-to-brittle transition temperature of less than or equal to $-5°$ C., more preferably less than or equal $-7°$ C., even more preferably less than or equal to $-10°$ C.

Preferred TPO's according to the invention have a propylene-based polymer content in the range of from 50 to 95 weight percent, more preferably 60 to 92.5 weight percent, even more preferably 65 to 90 weight percent.

The branched elastomer content of the TPO is preferably in the range of from 50 to 5 weight percent, more preferably 40 to 7.5 weight percent, even more preferably 35 to 10 weight percent. In one embodiment, the propylene-based polymer and the branched elastomer comprise the total polymer content of the TPO.

Such compositions can optionally contain additional components such as a crystalline ethylene-based polymer, an ethylene-based elastomer, or combinations thereof. A preferred crystalline ethylene-based polymer is a polyethylene thermoplastic. Such a crystalline ethylene-based polymer can be a low density polyethylene, but is preferably a random copolymer of ethylene and at least one $\alpha$-olefin, most preferably selected from $C_3$–$C_8$ linear or branched $\alpha$-olefins, with a density in the range of about 0.9 to about 0.97 g/cc.

Other non-branched or less branched ethylene based elastomers can be also included in the compositions. These elastomers are amorphous to semi-crystalline copolymers of ethylene and one or more $C_3$ to $C_{20}$ $\alpha$-olefins, and contain optionally non-conjugated dienes. Typical examples of this family include EPM's and EPDM's, ethylene-butene copolymers and ethylene-octene copolymers. These elastomers typically have a density in the range of about 0.86 to about 0.9 g/cc.

Typical crystalline ethylene-based polymer has a melt flow index (MFI) from about 0.1 to 50, more preferably from about 0.2 to 40, even more preferably from about 0.5 to 30. As in the case of the branched elastomer modifier, the MFI of the crystalline ethylene based polymer is selected in function of the MFR of the base polypropylene of the TPO compound. The other non branched or less branched ethylene based elastomer that can be included in the composition has a Mooney viscosity measured at (1+4 @ 125 C.) comprised between 1 and 90, more preferably between 2 and 70, even more preferably between 5 and 60.

The optional crystalline ethylene-based polymer content is preferably in the range of from 0 to 20 weight percent. The optional additional amorphous or semi-crystalline ethylene-based elastomer content is preferably in the range of from 0 to 20 weight percent. All weight percents are based on the total of the four polymer components in the blend excluding additives.

Additionally, typical compounding ingredients well known to those skilled in the art can also be added to the composition in amounts sufficient to accomplish their intended purpose. Such compounding ingredients include but are not limited to dyes, pigments, fillers (such as talc), plasticizers, antioxidants, light stabilizers, nucleating agents, processing aids, or combinations thereof.

Such additives are added to the blend in amounts sufficient to accomplish their intended purpose. Appropriate amounts and potential impact on other mechanical properties are known to those skilled in the art.

One of the key factors controlling TPO performance is the morphology obtained in the TPO molded part. This morphology is largely controlled by the difference in viscosity existing between the base polypropylene matrix and the elastomeric modifier during the TPO melt blending and molding processes. The larger the viscosity mismatch between these two components, the coarser will be the morphology of the molded TPO part. It is well known by those skilled in the art that the viscosity of the modifier is to be selected in function of the viscosity of the base polypropylene. For instance, high MFR polypropylene will require elastomeric modifiers of lower molecular weight (i.e. lower Mooney viscosity), while lower MFR polypropylene will enable the use of elastomeric modifiers of higher molecular weight (higher Mooney viscosity). In addition, the blending conditions and the molding conditions will further affect TPO blend morphology.

Test Methods

Mooney viscosity was measured by ASTM method D-1646 at (1+4 @ 125° C.) on non-remassed samples.

Mooney Stress Relaxation was measured on a MV 2000 E version 12.2 according to ASTM D-1646 after Mooney viscosity measurement at (1+4 @ 125° C.). Mooney Relaxation Area (MLRA) is calculated according to the equation:

$$MLRA=[100^{(a+1)}-1]*[k/(a+1)]$$

in which "a" and "log(k)" are respectively the slope and intercept of the least square regression line of log(Mooney torque) versus log(relaxation time) measured between 1 and 100 seconds relaxation time and using equipment build-in data sampling protocol.

Melt Flow Index (MFI) was measured by ASTM method D-1238(E).

Melt Flow Rate (MFR) was measured by ASTM method D-1238(L).

Ethylene content was measured by ASTM D 3900 A or B.

Ethylidene norbornene (ENB) was measured by ASTM D 6047.

Other non-conjugated diene content was measured by 1H nuclear magnetic resonance (1H NMR). Octene content was measured by carbon 13 nuclear magnetic resonance (C-13 NMR). Such methods are well known to those skilled in the art.

Melting point ($T_m$) for the polypropylene component is measured according to ASTM D-3417.

Melting point ($T_m$), multiple melting peak, and any measurements related to detection of crystalline melting or crystallization (e.g. enthalpy of crystallization) for the elastomers are measured by Modulated Differential Scanning Calorimetry (MDSC) or obtained from commonly accepted publications such as typical transition temperatures shown in Principles of Polymer Systems, Rodriguez, 2d ed., McGraw Hill Chemical Engineering Series, p. 38, Table 3-1. Modulated DSC is described for example by Perena Conde J. M., "Modulated-Temperature Differential Scanning Calorimetry. A further step in the study of thermal properties," *Rev. Plast. Mod.* 73(487) pp 26–31 (1997), and by Schawe J. E. K, "Principles for the Interpretation of Temperature-Modulated DSC Measurements, Part 2: A Thermodynamic Approach," *Thermochim. Acta*, 298(1–2) pp 9–16 (1997).

MDSC was performed on a TA Instruments 2920 Modulated DSC, operated on modulated mode and equipped with liquid nitrogen cooling unit. A 2 to 4 g sample is placed in a mold (60×60×0.8 mm) and pressed at 150° C. for 5 minutes with a pressure of 50 bars. The sample is transferred to a press at room temperature where it is kept under pressure for 5 minutes while cooling down. A central piece of the molded sample (5 to 8 mg) is removed with a punch die and annealed for 48 hours at room temperature. The sample is then encapsulated in a standard non-hermetic aluminum pan and transferred into the equipment-measuring device. It is first cooled down to –100° C. It is subsequently heated to 150° C. at a rate of 5° C./min. and modulated with ±0.5° C. in periods of 60 seconds. The sample is kept isothermally at 150° C. for 5 minutes. It is then cooled to –100° C. at a rate of 5° C./min. and modulated with ±0.5° C. in periods of 60 seconds. The sample is kept isothermally at –100° C. for 5 minutes, and then a second heating cycle is applied under the same conditions as the first one.

The equipment records the non-reversing heat flow, the reversing heat flow, and the total heat flow, and calculates the derivative of the reversing heat flow. This derivative is used to separate the limits of the glass transition temperature from those of the melting endotherms and crystallization exotherms. The heat of crystallization was determined from the total heat flow curve recorded during the second cooling cycle, by integrating the area under the crystallization peak within the limits determined by the derivative of the reversing heat flow. Enthalpies are reported in Joules per gram (J/g) of sample.

Impact property measurement and determination of the ductile-to-brittle transition temperature (DBT): The blends were injection molded into test pieces suitable for the measurement of the Izod impact test (ISO 180). Izod test specimens are prepared according to ISO 180/4A (1982) with length/width/thickness, respectively, equal to 63.5±2 mm, 12.7±0.2 mm, 3.2±0.2 mm. The samples are notched in the middle (sharp "V"-shaped notch) to the following notch dimensions: opening angle=45±1 degree; radius of notch base=0.25±0.05 mm; notch depth=2.54 mm. The notched specimens are tested for ductile to brittle transition (DBT) with a pendulum having an energy of 5.5 Joules. Impact tests were measured on notched specimens from 23° C. to lower temperatures. Individual tests were performed at 5° C. intervals as the temperature of the test specimens was reduced. For each temperature, 5 test replicates were performed. The DBT corresponds to the testing temperature at which approximately half of the test specimens failed in a brittle mode and the other half failed in a ductile mode.

All disclosures and specifications referred to in the above descriptions of testing procedures are fully incorporated herein by reference for purposes of U.S. patent practice.

EXAMPLES

TPO blends of polypropylene and EP or EPDM were prepared in a Pomini (1.6 liter) internal mixer. The TPO blends were pelletized and injection molded into test pieces with a Boy 30 Ton injection molding machine at 220° C. All blends used the same formulation with a polypropylene reactor copolymer (Finapro™ 9760 G supplied by Fina) of melt flow rate=25 (2.16 Kg @ 230° C.). The formulation used is described in Table 1.

TABLE 1

Experimental TPO Blends

| Blend Component | Parts by Weight of Blend |
|---|---|
| Elastomer modifier* | 22 |
| Finapro ™ 9760G | 78 |
| Irganox ™ B215 | 0.1 |

*A series of experimental and commercial polymers were used in the TPO blend formulation as shown in Table 2.

The elastomer modifiers tested included both branched and linear elastomers. Commercially available elastomers are identified in Table 2 by their trade names.

The branched polymer of Example 9 (Elastomer 3) has been synthesized according to the method described in U.S. Pat. No. 5,674,613 by copolymerizing ethylene with propylene and vinylnorbornene. In this polymer, the long chain branching is believed to result from the partial copolymerization of the 2 unsaturations of the vinylnorbornene comonomer with the ethylene and propylene monomers.

The branched polymers of Examples 10 to 15 (Elastomers 4–9) have been synthesized by copolymerizing ethylene with propylene and ethylidene norbornene in the presence of $VCl_4$ and aluminium sesquichloride (EASC) in a continuous stirred tank reactor (CSTR) in hexane as solvent, and under a pressure of about 7 $Kg/cm^2$. The concentration ratio of aluminium alkyl to vanadium was about 5 mole/mole, the reaction temperature was about 45° C., the concentration of the polymer in the hexane solvent was in the range of 4 to 6 wt. %, and the residence time was about 7 to 8 minutes. The reaction temperature was controlled by cooling the hexane and monomer feeds. About 300–350 g. polymer were produced per g. of catalyst. In these polymers, the branching is believed to result from the cationic coupling of ENB containing polymer molecules in the presence of the acidic $VCl_4$ catalyst. The linear polymer of comparative Example 4 (Elastomer 2) has been synthesized by the same CSTR process as the branched polymers described above, but in the absence of ethylidene norbornene, and with $VOCl_3$ as catalyst and EASC as cocatalyst. Ammonia was injected into the reactor at a rate of 1.7 mole per mole of catalyst. The reaction temperature was about 35° C., and the reaction produced about 800 g polymer per g of catalyst.

The linear copolymers of Comparative Examples 1, 19, 20, 21 (Elastomers 1, 10, 11, 12) were synthesized in a CSTR by copolymerizing ethylene with propylene or octene in the presence of metallocene catalysts. These catalysts used a metallocene dimethyl compound and an activator such as N,N-dimethylanilinium tetrakis(penta-fluorophenyl) boron or N,N-dimethylanilinium tetrakis (heptafluorophenyl) boron to yield metallocene cations. The metallocenes can be dimethylsilyl bis(indenyl)haf-nium dimethyl compound, or [cyclopentadienyl(fluorenyl) diphenylmethane)]hafnium dimethyl compound. Polymerizations were conducted in the range of 35 to 60° C. and produced 10 to 20 kg polymer per gram of catalyst.

Elastomers 2 to 9 were produced in a semi-works pilot unit with an output of about 1 ton/day. Elastomers 1 and 10–12 were produced in a laboratory pilot with an output of about 4 kg/day.

The branched elastomers of this invention permit achieving an improvement in low temperature performance of blends with polypropylene. Additionally, their ethylene content is high enough to permit handling branched elastomer in pellet form without significant agglomeration of the pellets, although suitable dusting agents can be used to further improve pellet resistance towards agglomeration. Experimental results of the example blends are summarized in Table 2. Examples 1–7 are shown graphically in FIG. 1, which illustrates the effect of elastomer ethylene content on the DBT of the TPO blends when essentially linear EP(D) M's are used. Examples 1–24 are shown graphically in FIG. 2, which illustrates the effect of elastomer ethylene content on the DBT of the TPO blends.

TABLE 2

TPO Blend Performance

| Example No. | Example Type | Elastomer Label | C2 Weight % (1) | C2 Mole % (4) | Co-monomer | ENB Weight % (1) | ML M.U. (1) | MLRA M.U.*s | Source | MLRA/ ML | DBT (Deg. C.) | Crystallization enthalpy (J/g) (5) |
|---|---|---|---|---|---|---|---|---|---|---|---|---|
| 1 | Comparative | Elastomer 1 | 37 | 47 | Propylene | 0 | 24 | 25 | ExxonMobil Chemical Co. | 1.0 | −15 | — |
| 2 | Comparative | Vistalon ™ 785 | 49 | 59 | Propylene | 0 | 30 | 40 | ExxonMobil Chemical Co. | 1.3 | −17 | <4 |
| 3 | Comparative | Vistalon ™ 504 | 59.5 | 69 | Propylene | 0 | 25 | 73 | ExxonMobil Chemical Co. | 2.9 | −9 | 9 |
| 4 | Comparative | Elastomer 2 | 68 | 76 | Propylene | 0 | 31 | 15 | ExxonMobil Chemical Co. | 0.5 | −8 | 19 |
| 5 | Comparative | Dutral ™ CO 034 | 70.5 | 78 | Propylene | 0 | 27 | 39 | Enichem | 1.4 | −2 | — |
| 6 | Comparative | Vistalon ™ MD 87-4 | 71.5 | 79 | Propylene | 0 | 46 | 64 | ExxonMobil Chemical Co. | 1.4 | −3 | — |
| 7 | Comparative | Vistalon ™ 703 | 72.5 | 80 | Propylene | 0 | 21 | 15 | ExxonMobil Chemical Co. | 0.7 | 0 | 34 |
| 8 | Comparative | Nordel IP ™ 3720 | 72 | 79 | Propylene | 0.5 | 28 | 67 | Dupont Dow Elastomers | 2.4 | −5 | 31 |
| 9 | Invention | Elastomer 3 | 77 | 83 | Propylene | 0.85 (2) | 22 | 192 | ExxonMobil Chemical Co. | 8.7 | −7 | 51 |
| 10 | Invention | Elastomer 4 | 76 | 82 | Propylene | 3.3 | 26 | 218 | ExxonMobil Chemical Co. | 8.4 | −7 | 46 |
| 11 | Comparative | Elastomer 5 | 50.3 | 60 | Propylene | 3.9 | 36 | 300 | ExxonMobil Chemical Co. | 8.3 | −15 | <4 |
| 12 | Invention | Elastomer 6 | 67.8 | 75 | Propylene | 3.9 | 29 | 248 | ExxonMobil Chemical Co. | 8.6 | −13 | 12 |
| 13 | Comparative | Elastomer 7 | 50 | 59 | Propylene | 4 | 47 | 470 | ExxonMobil Chemical Co. | 10.0 | −15 | — |
| 14 | Invention | Elastomer 8 | 67 | 74 | Propylene | 4.1 | 39 | 370 | ExxonMobil Chemical Co. | 9.5 | −15 | 12 |
| 15 | Invention | Elastomer 9 | 67.5 | 75 | Propylene | 4.1 | 48 | 570 | ExxonMobil Chemical Co. | 11.9 | −15 | — |
| 16 | Comparative | Esprene ™ 524 | 71.5 | 78 | Propylene | 4.5 | 24 | 101 | Mitsui | 4.2 | −3 | — |
| 17 | Comparative | Nordel ™ 2722 | 76 | 81 | Propylene | 5.5 (3) | 23 | 164 | Dupont Dow Elastomers | 7.1 | −3 | — |
| 18 | Comparative | Nordel ™ 2744 | 73 | 79 | Propylene | 6 (3) | 46 | 307 | Dupont Dow Elastomers | 6.7 | −4 | — |
| 19 | Comparative | Elastomer 10 | 75 | 92 | Octene | 0 | 28 | 39 | ExxonMobil Chemical Co. | 1.4 | −2 | 53 |

TABLE 2-continued

TPO Blend Performance

| Example No. | Example Type | Elastomer Label | C2 Weight % (1) | C2 Mole % (4) | Co-monomer | ENB Weight % (1) | ML M.U. (1) | MLRA M.U.*s | Source | MLRA/ ML | DBT (Deg. C.) | Crystallization enthalpy (J/g) (5) |
|---|---|---|---|---|---|---|---|---|---|---|---|---|
| 20 | Comparative | Elastomer 11 | 63 | 87 | Octene | 0 | 14 | 10 | ExxonMobil Chemical Co. | 0.7 | −7 | 47 |
| 21 | Comparative | Elastomer 12 | 74 | 92 | Octene | 0 | 39 | 77 | ExxonMobil Chemical Co. | 2.0 | −4 | — |
| 22 | Comparative | Engage ™ 8180 | 60 | 86 | Octene | 0 | 37 | 55 | Dupont Dow Elastomers | 1.5 | −12 | — |
| 23 | Comparative | Engage ™ 8100 | 65 | 88 | Octene | 0 | 20 | 18 | Dupont Dow Elastomers | 0.9 | −12 | — |
| 24 | Comparative | Engage ™ 8150 | 64 | 88 | Octene | 0 | 34 | 32 | Dupont Dow Elastomers | 0.9 | −10 | — |

(1) $C_2$= content measured according to A5TM D 3900, uncorrected for diene content. Octene content measured by $^{13}C$ NMR. ENB (5-ethylidene-2-norbornene) content measured according to ASTM D 6047. Other diene content measured by 1H NMR. Mooney viscosity measured at (1 + 4 @ 125 C.) according to ASTM D1646.
(2) Diene is Vinylnorbornene.
(3) Diene is a mixture of ENB (5-ethylidene-2-norbornene) and Norbornadiene.
(4) Mole % ethylene corrected for diene
(5) Crystallization enthalpy of the elastomer shown in column 3 measured with a Modulated DSC equipment after sample annealing @ 150° C. Heating/cooling rate is 5° C. per minute, with modulations of 60 sec. and +/− 0.5 deg. C. amplitude.

Examples 12, 14, and 15, showing blends of polypropylene with semi-crystalline branched elastomers according to this invention, produce similar DBT performance to blends with amorphous (low ethylene content) polymers of similar or lower MLRA/ML ratio as shown in comparative Examples 1, 2, 11, and 13. Thus, the dependence of DBT performance of polypropylene/modifier blends upon the ethylene content of the modifier is significantly reduced.

Furthermore, examples 9, 10, 12, 14, and 15 of the invention have similar to or better DBT performance than blends using ethylene-octene polymers as shown in comparative Examples 19 to 24 as the modifier, or linear or less branched EP and EPDM's. From Table 2, it can be readily seen that the ethylene-octene polymers have a much lower level of branching than the polymers of this invention since their MLRA/ML ratio does not exceed a value of 2.

FIG. 2 graphically depicts the new and unexpected balance of properties accomplished by this invention. Superior DBT performance is obtained while even though the ethylene content of the elastomer is sufficient to permit storage in pelletized form without significant agglomeration.

It should be understood that a wide range of changes and modifications can be made to the embodiments described above. It is therefore intended that the foregoing description illustrates rather than limits this invention, and that it is the following claims, including all equivalents, which define this invention. For example, one skilled in the art would be familiar with the use of additives typically used in such TPO's such as, but not limited to, dyes, pigments, plasticizers, antioxidants, nucleating agents, light stabilizers, processing aids, and combinations thereof, and further including fillers. Typical fillers used in TPO's are talc, calcium carbonate and glass fibers.

It will additionally be apparent to those knowledgeable in the art that any one or more of the propylene-based polymer, the branched elastomer, or the crystalline ethylene-based polymer can be a blend of two or more polymers provided that each such blend is considered a single component with respect to this disclosure.

What is claimed is:

1. A polymer composition comprising
   a) a first polymer of propylene and optionally one or more comonomers selected from ethylene and $C_3$ to $C_{20}$ α-olefins, said polymer having a melting point of 110° C. or more derived from propylene crystallinity; and
   b) a second polymer comprising ethylene and one or more $C_3$ to $C_{20}$ α-olefins, said second polymer having a MLRA/ML ratio of 8 or more and an ethylene content of from about 74 to about 95 mole percent.

2. The composition of claim 1 wherein said second polymer has a crystallization enthalpy of at least 12 J/g.

3. The composition of claim 1 wherein said composition has ductile-to-brittle transition temperature of less than or equal to −5° C.

4. The composition of claim 1 wherein said first polymer is 60 mole percent or more units derived from propylene.

5. The composition of claim 1 wherein said second polymer further contains one or more non-conjugated diene comonomers.

6. The composition of claim 1 wherein said second polymer is an ethylene-propylene copolymer having a crystallization enthalpy of less than or equal to 100 J/g.

7. The composition of claim 1 wherein said second polymer is EPDM.

8. The composition of claim 1 wherein said first polymer is present in an amount in the range of from 95 to 50 weight percent and said second polymer is present in an amount in the range of from 5 to 50 weight percent based upon the combined weight of all polymers in the blend.

9. The composition of claim 7 further comprising up to 20 weight percent of a third polymer which is a crystalline polymer of ethylene and optionally one or more comonomers selected from $C_3$ to $C_{20}$ α-olefins.

10. The composition of claim 9 wherein said third polymer is a polyethylene homopolymer.

11. The composition of claim 9 wherein said third polymer is a copolymer of ethylene and one or more $C_3$ to $C_8$ α-olefins.

12. The composition of claim 7 further comprising up to 20 weight percent of an additional amorphous or semi-crystalline polymer of ethylene and one or more comonomers selected from $C_3$ to $C_{20}$ α-olefins and optionally a non conjugated diene.

13. The composition of claim 1 further comprising effective amounts of additives such as dyes, pigments, fillers, plasticizers, antioxidants, light stabilizers, talc, processing aids, or combinations thereof.

14. The composition of claim 1 wherein said second polymer comprises ethylene is in the range of from 76 to 90 mole percent.

15. A molded article formed from the composition of claim 1.

16. A molded article formed from the composition of claim 13.

* * * * *